United States Patent [19]

Yasuye et al.

[11] 4,345,312
[45] Aug. 17, 1982

[54] METHOD AND DEVICE FOR INSPECTING THE DEFECT OF A PATTERN REPRESENTED ON AN ARTICLE

[75] Inventors: Toshikazu Yasuye; Seiji Kashioka, both of Hachiouji; Yoshihiro Shima, Kokubunji, all of Japan

[73] Assignee: Hitachi, Ltd., Tokyo, Japan

[21] Appl. No.: 138,990

[22] Filed: Apr. 10, 1980

[30] Foreign Application Priority Data

Apr. 13, 1979 [JP] Japan .................. 54-48141[U]
Aug. 15, 1979 [JP] Japan .................. 54-103141

[51] Int. Cl.³ .................. G06K 9/36; G06F 15/20
[52] U.S. Cl. .................. 364/515; 250/563; 340/146.3 AH; 340/146.3 MA; 358/106
[58] Field of Search .................. 356/237, 239; 250/562, 250/563, 565, 571, 572; 358/101, 106; 364/507, 515; 340/196.3 Q, 196.3 AQ, 196.3 AH, 196.3 MA

[56] References Cited

U.S. PATENT DOCUMENTS

| | | | |
|---|---|---|---|
| 3,492,646 | 1/1970 | Bene et al. .................. | 340/146.3 Q |
| 3,576,534 | 4/1971 | Steinberger .................. | 340/146.3 MA X |
| 3,849,762 | 11/1974 | Fujimoto et al. .................. | 340/146.3 Q |
| 3,887,762 | 6/1975 | Uno et al. .................. | 358/106 |
| 3,898,617 | 8/1975 | Kashioka et al. .................. | 340/146.3 AH X |
| 3,930,231 | 12/1975 | Henrichon, Jr. et al. .................. | 340/146.3 MA |
| 4,040,009 | 8/1977 | Kadota et al. .................. | 340/146.3 AQ |
| 4,110,737 | 8/1978 | Fahey .................. | 340/146.3 Q |

*Primary Examiner*—Felix D. Gruber
*Attorney, Agent, or Firm*—Craig & Antonelli

[57] ABSTRACT

Herein disclosed is a pattern defect inspecting method which is characterized: in that an image is picked up from an article having a preset pattern thereby to extract the data of the pattern to be inspected while shifting the article with respect to the standard position preset in a picking-up picture image; in that a parameter indicating the defective degree of the pattern to be inspected is determined on the basis of the aforementioned data extracted and the dictionary data stored in advance; in that the parameter indicating the minimum defective degree is extracted from among those determined for such plural patterns to be inspected as are extracted from the vicinity of the standard position; and in that the parameter extracted is compared with a preset threshold value thereby to determine the propriety of the pattern.

15 Claims, 26 Drawing Figures

FIG. 1
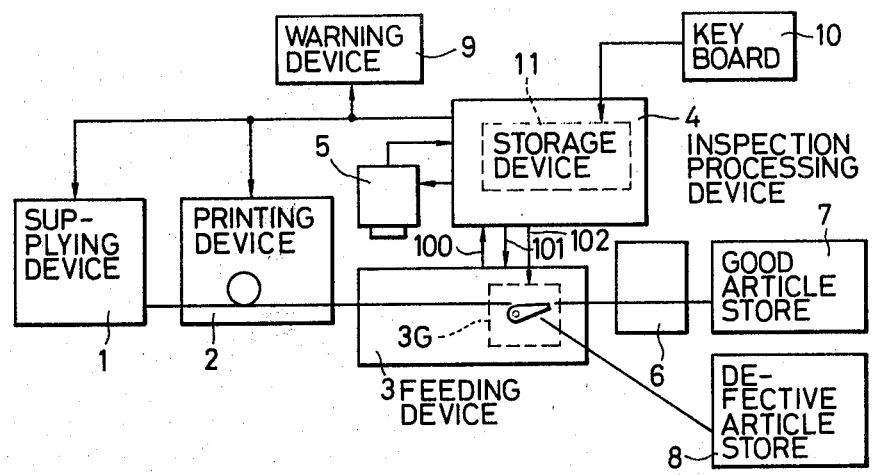
FIG. 2a
FIG. 2b
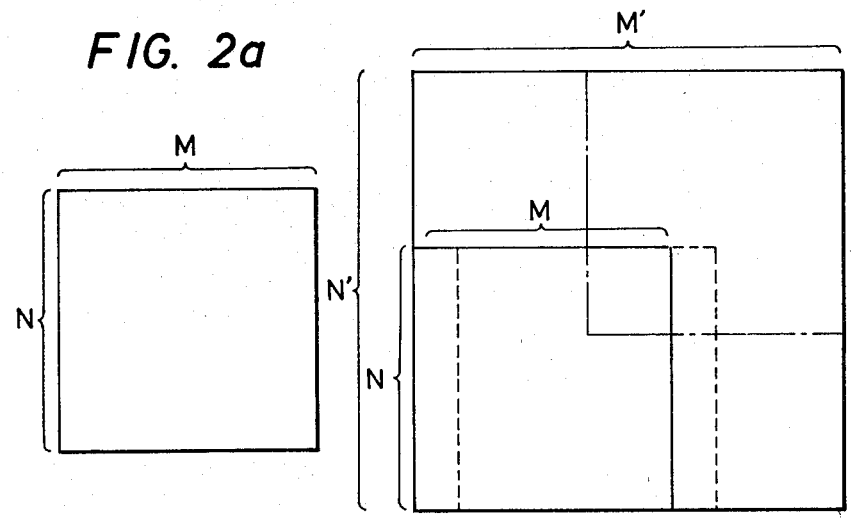

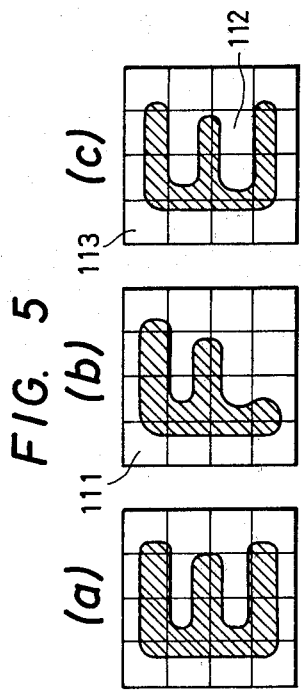

(a)

(b)

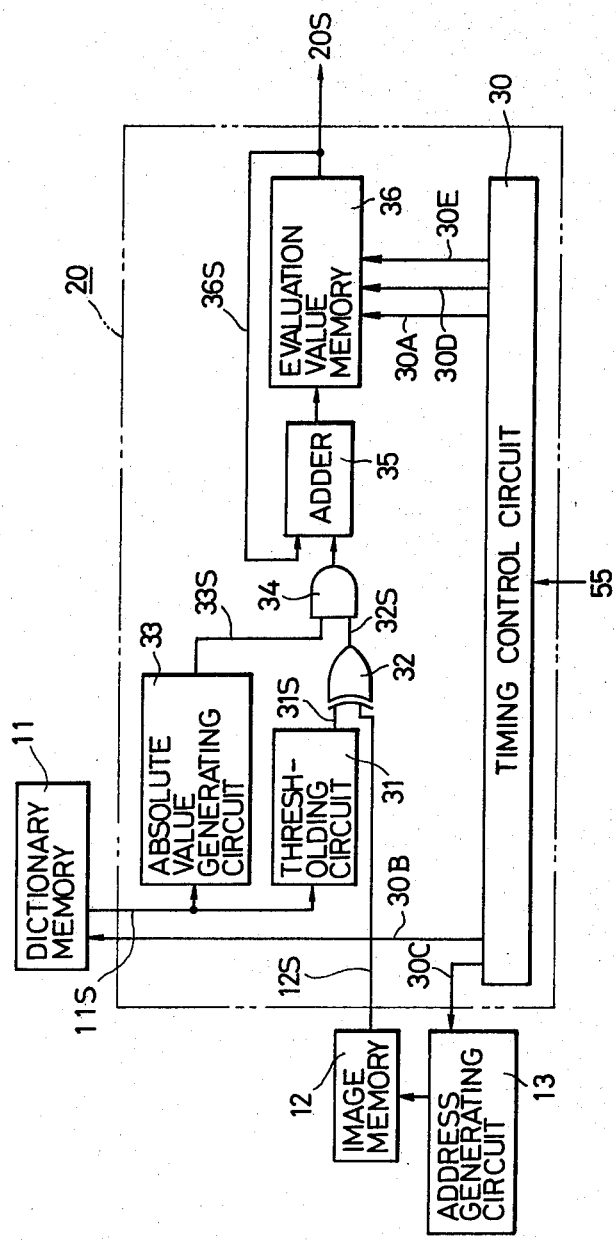

FIG. 11
| $X_{i-1,j-1}$ | $X_{i,j-1}$ | $X_{i+1,j-1}$ |
|---|---|---|
| $X_{i-1,j}$ | $X_{i,j}$ | $X_{i+1,j}$ |
| $X_{i-1,j+1}$ | $X_{i,j+1}$ | $X_{i+1,j+1}$ |
FIG. 12
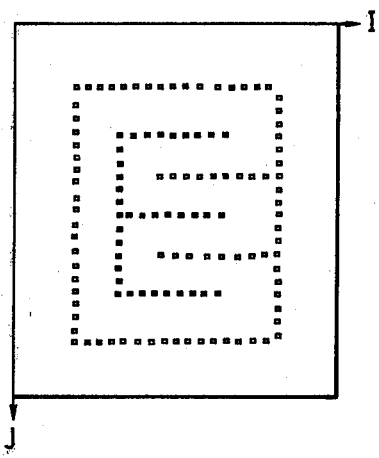
FIG. 14
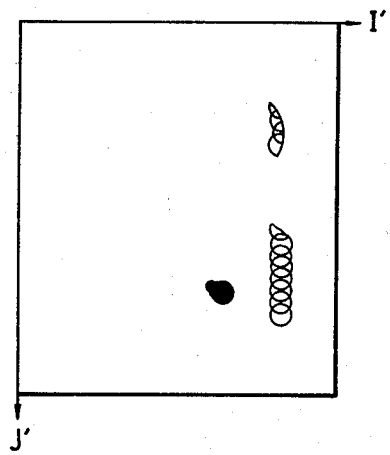

FIG. 16

| COUNTER / TIMING | 61-1 INPUT VALUE | 61-1 COUNT VALUE | 61-2 INPUT VALUE | 61-2 COUNT VALUE | 61-3 INPUT VALUE | 61-3 COUNT VALUE | 71 INPUT VALUE | 71 COUNT VALUE |
|---|---|---|---|---|---|---|---|---|
| T1 | | 0 | | 0 | | 0 | | 0 |
| T2 | +1 | 0 | | | | | | |
| T3 | | 1 | +1 | 1 | | | | |
| T4 | +1 | 0 | | | +1 | 1 | | |
| T5 | | 1 | +1 | 2 | | | | |
| T6 | | | | 1 | | 0 | +1 | 1 |
| T7 | +1 | 2 | | | | | | |
| T8 | | 1 | +1 | 2 | | 0 | | |
| T9 | | | | 3 | +1 | 1 | | |
| T10 | | | | 2 | | 0 | +1 | 2 |
| TOTAL | +3 | | +4 | | +2 | | +2 | |

FIG. 19

| COUNTER TIMING | 61-1 INPUT VALUE | 61-1 COUNT VALUE | 61-2 INPUT VALUE | 61-2 COUNT VALUE | 61-3 INPUT VALUE | 61-3 COUNT VALUE | 71 INPUT VALUE | 71 COUNT VALUE |
|---|---|---|---|---|---|---|---|---|
| T 1 |  | 0 |  | 0 |  | 0 |  | 0 |
| T 2 |  | 0 | +1 |  |  | 0 |  |  |
| T 3 | +1 | −1 |  | 1 |  | 0 | +1 |  |
| T 4 |  | 0 |  | 0 |  | −1 |  | 1 |
| T 5 | +1 | −1 | +1 | 1 |  | −2 |  |  |
| T 6 |  | 0 |  | 0 |  | −2 |  |  |
| T 7 | +1 | 0 |  | 0 |  |  | +1 | 2 |
| T 8 |  | 1 |  |  |  |  |  |  |
| T 9 |  | 0 |  | 0 |  |  |  |  |
| T 10 |  |  |  | −1 |  | −1 |  |  |
| T 11 |  |  |  |  | +1 | −2 |  |  |
| T 12 |  |  |  |  |  |  | +1 |  |
| T 13 |  |  |  |  |  |  |  | 3 |
| TOTAL | +3 |  | +2 |  | +1 |  | +3 |  |

METHOD AND DEVICE FOR INSPECTING THE DEFECT OF A PATTERN REPRESENTED ON AN ARTICLE

BACKGROUND OF THE INVENTION

1. Field of the Invention

The present invention relates to a method and device for inspecting an article to detect a defect in a pattern, such as a character or symbol, represented on the article.

2. Description of the Prior Art

In the case of a preset pattern represented on a number of articles by a stamping process, such as a character printed on the package of a transistor or an IC, in order to retain the quality of the pattern, it is necessary to inspect the pattern and to detect a defective pattern, if any. Conventionally, since the quality inspection of the pattern represented on the article has been manually accomplished, an automatic inspection device has been desired for sparing the man power required by the conventional method.

SUMMARY OF THE INVENTION

It is therefore an object of the present invention to provide a pattern defect inspecting method and device for enabling the pattern represented on an article to be automatically inspected with a high accuracy.

In order to attain this object, according to the present invention, there is provided a pattern defect inspecting method and device of the type, in which an image is picked up from an article having a preset pattern, in which the data of a pattern to be inspected is extracted while being shifted with respect to a reference position preset in the picked-up image, in which parameters indicating the extent of defects in the respective patterns to be inspected are determined on the basis of both the data of such plural patterns to be inspected as extracted while being shifted in the vicinity of the reference position and a dictionary of data stored in advance, in which the parameter indicating the minimum defective degree is extracted from the determined parameters, and in which the extracted parameter is compared with a preset threshold value thereby to determine the propriety of the pattern.

BRIEF DESCRIPTION OF THE DRAWINGS

FIG. 1 is a block diagram showing one example of a pattern printing device followed by a pattern defect inspecting device according to the present invention;

FIGS. 2a and 2b are diagrammatical views illustrating the construction of a pattern so as to explain the operations of the device of FIG. 1;

FIGS. 5a, b, c are diagrammatical views showing the differences among the patterns to be inspected;

FIG. 6 is a block diagram showing one embodiment of an arithmetic circuit constituting a major portion of the pattern defect inspecting device;

FIG. 9 is a block diagram showing the second embodiment of the arithmetic circuit;

FIGS. 11 and 12 are diagrammatical views illustrating the local pattern and dictionary pattern of the third embodiment of the arithmetic circuit;

FIG. 14 is a diagrammatical view illustrating the inspection results of the third embodiment of the arithmetic circuit;

FIG. 16 is a table explaining one example of the counting operations of the respective counters of FIG. 15;

FIG. 19 is a table explaining one example of the counting operations of the counter of FIG. 18;

DESCRIPTIONS OF THE PREFERRED EMBODIMENTS

Figure 3:
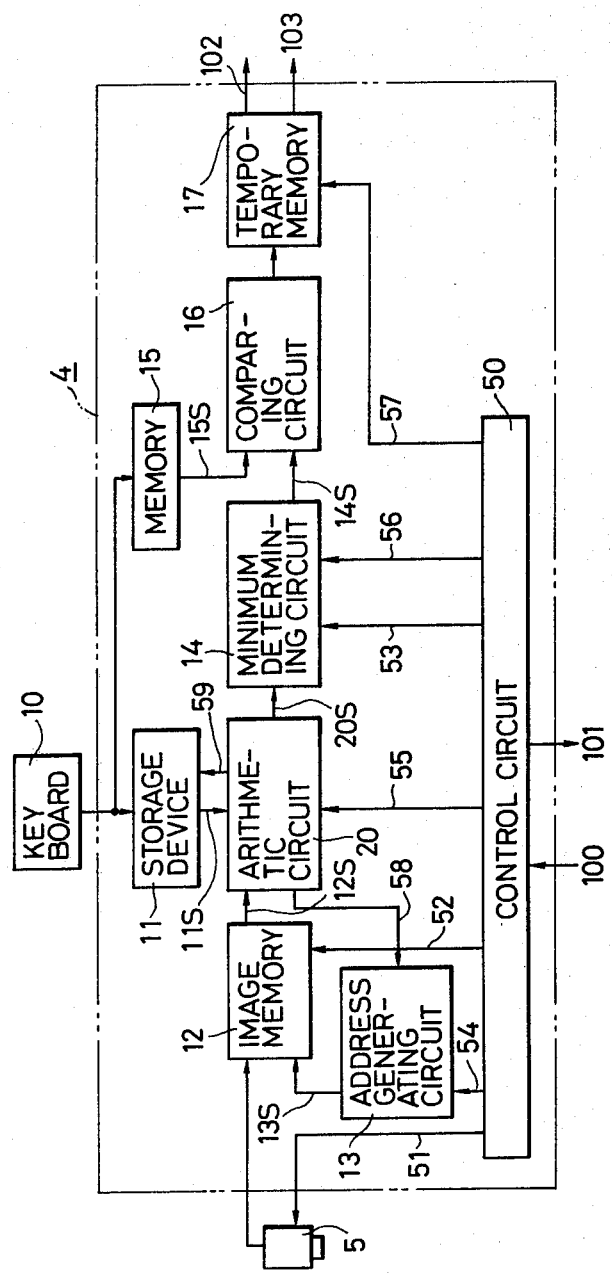
FIG. 3 is a block diagram showing the construction of of one embodiment of the pattern defect inspecting device according to the present invention.

The present invention will now be described in detail with reference to the accompanying drawings.

FIG. 1 shows the overall construction of a pattern printing device which may include a pattern defect inspecting device according to the present invention.

Here, the articles for printing a pattern may take either a form, in which the articles are isolated from one another, or a form, in which a preset number of articles are connected with one another, such as a transistor or IC package. Those articles are fed in their arrayed condition out of a supplying device 1 and a pattern is printed thereon by a printing device 2, after which they are introduced into a feeding device 3 for inspection. This feeding device 3 detects that the articles come into their inspection position and informs an inspection processing device 4 of this fact by generating a signal 100. In response to this signal, the inspection processing device 4 reads out the pattern, which is printed on the article, from an image pick-up device 5 thereby to judge the existence of a defect.

Throughout the present specification, the feeding device 3, image pick-up device 5 and inspection processing device 4 make up an inspecting device.

In accordance with the results of the inspection, the inspection processing device 4 generates a signal 102, by which an article removing mechanism 3G in the feeding device 3 is operated if there is any defect in the pattern. In case a plurality of articles are supplied under their connected condition, the removing mechanism is actuated to accomplish a removing operation when it is judged that any of the articles has a defective pattern. In this case, a spacing to be determined by the number of connection of the articles and the removing mechanism is formed between the position, where the image pick-up device 5 reads out the patterns, and the removing mechanism.

The articles, which have been judged to have no defective pattern by the aforementioned inspection, are fed to a good article store 7 through a drying device 6 provided, if necessary, whereas the articles, which have been judged to have a defective pattern, are fed to a defective article store 8.

In case the feed of the articles is performed continuously, the image picking-up operations are effected either instantaneously or by means of a line sensor. In case, on the other hand, the article feed is performed intermittently, the inspection processing device 4 may be made to command the subsequent feed to the supplying device 1. In an alternative, moreover, the articles are made to stand by in the conveying path between the printing device 2 and the feeding device 3 so that the difference in the feeding speed inbetween may be absorbed.

The inspection processing device 4 either starts a warning device 9 or feeds a stopping command 103 to the supplying device 1 and the printing device 2, when at least a preset number of articles are judged to have a defective pattern from among a preset number of articles, so that the printing operations of the defective pattern and the misjudgements of the good articles due to the abnormality in the inspection processing device 4 can be prevented from being continued.

The aforementioned inspection processing device 4 is equipped with a storage device 11 for storing the dictionary data corresponding to the kinds and printing contents of the articles and a key board 10 for commanding which is to be selected from several kinds of the printing contents so that the dictionary data can be read out or written in accordance with the command.

In the type of the dictionary data to be adopted, the reference pattern which is converted into a bit matrix of "1" and "0" binary values in a manner to correspond to the whiteness and blackness of each picture element is used for the ideal two-dimensional pattern, which is printed on the surfaces of the articles, so that reference may be made to the pattern to be inspected, which is also converted in the bit matrix format. In other words, two patterns are superposed to determine a different portion, the area of which is used as a parameter of the defect.

If, in this instance, there is any setting discrepancy and dispersion in the position alignment between the articles and the pattern in the printing position or between the articles and the image pick-up device in the inspecting position, it will not be clear whether the position discrepancy or the defect of the pattern has caused the aforementioned difference in comparison between the patterns so that the correct judgement cannot be accomplished. However, it is not advisable that special means is provided with a view to detecting only the position discrepancy of the pattern. This is because an increase in the device size is invited thereby.

In the inspecting device according to the present invention, therefore, when the partial pattern to be compared to the standard pattern composed of the picture elements $N \times M$, as shown in FIG. 2a, is to be extracted from the pattern to be inspected, the conceivable range of the picture elements of $N' \times M'$ of the position discrepancy is determined, as shown in FIG. 2b, so that the partial pattern is extracted in each discrepancy position while the range is shifted at a preset rate. For example, the partial pattern, as shown in solid lines in FIG. 2b, is first extracted, and the partial pattern, as shown in broken lines, which is shifted horizontally one element (or n elements), is then extracted, and so on. These operations are repeated in a sequential manner until the partial pattern, as shown in dotted lines, is extracted. Then, the partial pattern extracted for each discrepancy position is compared to the standard pattern thereby to determine the parameters indicating the extent of the defects, among which the parameter indicating the minimum defect is employed as the defect parameter. This is because it is conceivable that the defect parameter takes its minimum under its aligned condition if the defect in the pattern is within a permissible range and that the defect parameter exceeds the permissible value, even if it is compared in any position to the standard pattern, if the defect in the pattern exceeds the permissible range.

FIG. 3 shows a block diagram including a control circuit for generating various control signals necessary for the inspection processing device and for generating the synchronous signal and clock 51 to control operation of the device 5. First of all, when a feed completion signal 100 is received from the feeding device 3 of FIG. 1 indicating that an article is in position to be inspected, an image picking-up command 52 is generated from the control circuit 50, and the synchronous signal and the clocks 51 and 54 are also supplied to the image pick-up device 5 and an address generating circuit 13 so that the image of the article picked up by the device 5 is stored in an image memory 12, whose storage area may correspond to the area $N' \times M'$, as seen in FIG. 2b, for example. At this time, the image memory 12 writes the image data in accordance with the address produced on line 13S which is generated by the address generating circuit 13. After the image is written in, the control circuit 50 generates a signal 101 which causes the feeding device 3 to start its loading operation of the articles to begin to move the next article into position for inspection.

Then, an initial setting signal 53 is fed to a minimum determining circuit 14 so that a maximum value is set therein as an initial value from the control circuit 50. On the other hand, the signals on lines 13S and 20S for repeatedly effecting sequential read-out of a selected portion of the image stored in memory 12, as described in conjunction with FIG. 2b, and comparison of these partial patterns with a standard pattern from storage device 11, with a view to detecting position discrepancy, are generated by the address generating circuit 13 and an arithmetic circuit 20. In response to the arithmetic clock 55 generated by the control circuit 50, address commanding signals on lines 58 and 59 are fed from the arithmetic circuit 20 to the address generating circuit 13 and the dictionary memory 11. As a result, the address generating circuit 13 generates the addresses on line 13S, which cause read-out of successive partial patterns that are slightly shifted for each cycle, as described in conjunction with FIG. 2b, which address signals are fed to the image memory 12.

Both the corresponding dictionary data provided on line 11S from in the dictionary memory 11 designated by the key board 10 and the data on line 12S generated from the image memory 12 are fed to the arithmetic circuit 20 so that a preset calculation is performed based on a point-by-point comparison between the two sets of data under control of the arithmetic clock 55 from the control circuit 50 whereby a defect parameter on line 20S is generated based on this comparison. This value on line 20S is compared at the end of the calculation and in response to a cycle ending signal 56 with the value, which is stored in the minimum determining circuit 14, so that the value stored in the minimum circuit is renewed when the newly determined value is lower than the previously-stored value.

When those operations are repeated until the final cycle is ended, as determined by the control circuit 50, there is stored in the minimum determining circuit 14 a value indicating the best reference result between the pattern to be inspected and the standard pattern, which has been performed while shifting the position at which data in memory 12 is read out. The value thus determined is fed as a signal 14S to a comparing circuit 16 and is compared with the permission value on line 15S of the corresponding pattern which is read in response to the command of the key board 10 out of the memory 15 in which there is stored in advance the permissible defect value for each pattern. The comparing circuit 16 generates a value "1", in case the minimum defect value 14S exceeds the aforementioned permission value 15S, but generates a value "0" in the other case. This signal is introduced into a temporary memory 17 as the judged results in response to the timing pulses 57 which are generated after the end of the final cycle so that it is fed as the removing signal to the article removing mechanism 3 after a preset time delay in the former case of the value "1". If, incidentally, the aforementioned temporary memory 17 is composed of a shift register having a preset length, the stopping command 103 can be generated by setting the output in a certain shift position at the removing signal and by summing the outputs in the respective shift positions when a certain value is exceeded, i.e., when at least a preset number of ones among the articles in the number corresponding to the length of the shift register are found defective.

Figure 4:
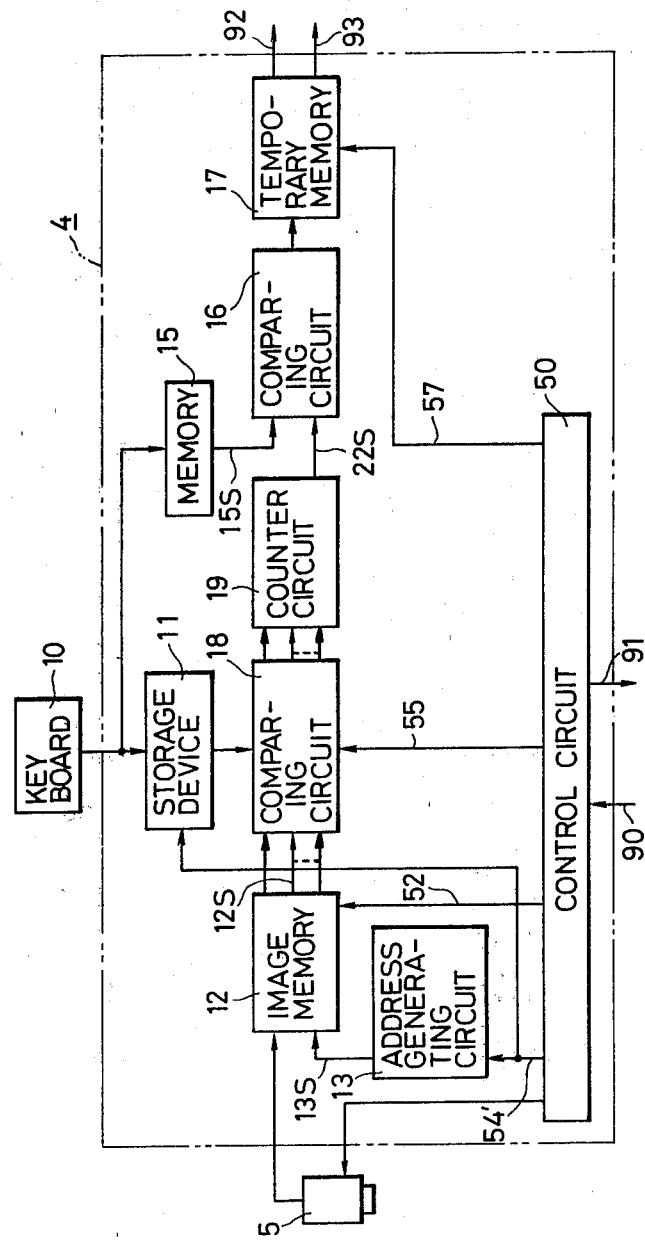
FIG. 4 is a block diagram showing the construction of another embodiment of the pattern defect inspecting device according to the present invention.

FIG. 4 shows another embodiment of the inspection processing device 4 of FIG. 1, according to which the partial pattern corresponding to each position discrepancy and the standard pattern are calculated and processed in parallel.

In FIG. 4, numerals 18 and 19 indicate a comparing circuit and a counter circuit, respectively, and other reference characters correspond to those indicated at the same characters of FIG. 3.

The embodiment shown in FIG. 4 is characterized in that the picture element of each local pattern at each discrepancy position, which corresponds to a picture element of the standard pattern read out of the dictionary memory 11, is read in parallel out of the image memory 12 and that the picture element of the standard pattern and each element of the local pattern at each discrepancy position are so compared that a signal "1" is generated when there is inconsistency inbetween. Incidentally, the reading-out operations of the memories 11 and 12 are commanded by an address signal 54'. The compared result signals thus generated in parallel from the comparing circuit 18 are counted by the corresponding counter of the counter circuit 19. These operations are accomplished for all the picture elements of the standard pattern so that the minimum of the counted values of the respective counters until that time is generated by the comparing circuit 16 as indicating the minimum pattern defective degree. In other words, the contents of the respective counters of the counter circuit 19 indicate the inconsistency area between the local pattern and the standard pattern at the corresponding position discrepancy, i.e., the defective degree of the local pattern.

The operations subsequent to the comparing circuit 16 are the same as those of the embodiment of FIG. 3.

Now, let it be considered that the pattern to be inspected is shifted one to four picture elements both horizontally and vertically with respect to the standard pattern. Data of 16 bits are read in parallel out of the image memory 12, and their inconsistency of 1 bit from the reference pattern of the dictionary memory 11 is detected by the comparing circuit 18 and is fed to the corresponding counter of the counter circuit 19.

In the foregoing embodiment, incidentally, although the inconsistency in the picture elements between the standard and local patterns is detected, the consistency inbetween may be detected, if preferred, and the maximum value of the counter at that time is fed to the comparing circuit 16 as indicating the minimum pattern defective degree. According to this modification, the maximum is compared with the value preset in the memory 15 so that a signal may be generated from the comparing circuit 16 when the output of the counter circuit 19 is lower than the preset value.

Other embodiments of the arithmetic circuit 20 shown in FIG. 3 will be described in the following.

For example, in case a pattern printed on an article is used, as it is, as the standard pattern, the line width of the pattern is varied from that of the standard one in accordance with the conditions upon the printing or image picking-up operations so that a partially different region is formed between the input and standard patterns. Since, however, the pattern can be recognized, even if its line width is varied to some extent, as a letter or symbol to human eyes without having its naturality deteriorated, it is necessary to set a certain permissible value for the area difference.

For example, if the patterns of letter "E" shown in FIGS. 5(a) and (c) are compared, they have a different portion of about 10% of the total area but they can be completely recognized as the letter "E". On the contrary, there is a case, in which it is difficult to recognize the pattern as the letter or symbol even if shortage or excessiveness takes place only in a small portion of the pattern. For example, the letter "E" may look quite different from the letter "F" if it has its lower horizontal stroke broken. On the contrary, the letter which intrinsically indicates "F" may look like "E" when it is blotted.

Therefore, the mere determination of the areas of the different regions of the input and standard patterns will make it difficult, unless they are large, to judge whether they are caused by the permissible change in the line width or by the defect of the impermissible kind. In the cases of FIGS. 5(a) and (b), the patterns are different only about 80% of their total areas so that their different areas are smaller than those between the patterns of FIGS. 5(a) and (c) but that they look absolutely different as letters. Thus, the difference in the cases of FIGS.

5(a) and (b) has to be deemed as the impermissible defect.

In order to solve the aforementioned problem, it is sufficient to adopt the following method.

Specifically, since the change in the line width takes place all over the pattern, the ratio of the different area and to the total area of the pattern is locally and wholly at the same level. For the pattern having a fatal defect, however, a higher difference ratio appears at some local position than the overall mean one. When the whole pattern is divided into the regions of 4×4, as shown in FIG. 5, the maximum difference of 22% takes place in the region 112 between FIGS. 5(a) and (c), but the difference of as high as 60% takes place in the region 111 between FIGS. 5(a) and (b).

According to a first method, therefore, the two patterns to be compared are respectively divided into a plurality of regions having a suitable area, and the areas of the different portions between the input and standard patterns are determined at each region and are judged whether they exceed the permissible range of the change in the line width. Thus, it is sufficient to determine the propriety of the pattern in accordance with the existence or number of the regions which are to be judged to exceed that permissible range.

FIG. 6 shows one embodiment of the arithmetic circuit 20 which is designed on the basis of the concept thus far described.

In this case, the reading operations of the data from the image memory 12 is accomplished such that the pattern image is divided into a plurality of regions and that the data is read out of one region and then another subsequent region. On the other hand, the dictionary memory 11 stores each standard pattern as the data of each of the plural regions so that the data of each pattern may be extracted in the extracting order of the region pattern from the aforementioned image memory 12. Moreover, the dictionary memory 11 stores at the same time the permissible value of the area difference of each of the aforementioned regions. In FIG. 6, incidentally, the memory portions for the standard pattern and for the allowed value are indicated at 11a and 11b, respectively.

In the circuit thus exemplified, the various timing signals required for the patterns to be inspected are generated by a timing control circuit 21 of the arithmetic circuit 20. A counter 25 is reset by a resetting signal 21A at each start of the respective pattern extracting cycles which are effected to cope with the position discrepancy while shifting the pattern extracting positions. The timing control circuit 21 feeds the address generating circuit 13 and the dictionary memory 11 with the data 21F and 21B indicating the numbers of the divided regions so that a group of the necessary data is read out to consecutively process the respective divided regions. At the start of the pattern comparison processing operation of each divided region, a counter 23 for detecting the area difference between the patterns is reset by pulses 21C so that clocks 21D are generated during the processing operation. Both the data 12S of the pattern to be inspected from the image memory 12 and the data 11A of the standard pattern read out of the memory portion 11a of the dictionary memory are fed to a disagreement detecting circuit 22 so that they are counted by the counter 23 in response to the clocks 21D when they disagree. When the data processing operation of each region is completed, the difference area thereof has already been determined by the counter 23.

As a result, this value is compared by a comparing circuit 24 with an allowed value 11B which is stored in the memory portion 11b of the dictionary memory 11 so that the counted value is counted as the areas of the defective regions in a counter 25 for counting the areas of the defective regions at the timing of a signal 21E representing the region processing completion. When the processing operation of all the regions is completed, the content of the counter 25 is generated as a defect parameter 20S.

The foregoing describes the fundamental operations of one embodiment of the arithmetic circuit 20. More accurate inspection can be performed by the following method. With reference to FIG. 5, more specifically, division is made into the regions of 4×4, for each of which the difference ratio of the pattern is examined. A difference of as high as 60% is established at a region 111 between the patterns of FIGS. 5(a) and (b) so that the defective region could be found. If the regions 113 between the patterns of FIGS. 5(a) and (c), which are considered to be naturally identical, is taken up, there still exists such a difference of about 15% as is not judged defective. In fact, it does not seem that there is so much difference in the regions 113 between the patterns of FIGS. 5(a) and (c). Therefore, a method is adopted, in which the divided regions are slightly shifted horizontally and vertically so that the minimum difference at that time is used as the difference of that divided region. According to this method, in case the region 113 of the pattern (a) is registered with the region 113 of the pattern (c), the difference area is reduced substantially to zero, if it is measured at such a position as is slightly shifted rightwardly and downwardly. At the region 111, however, there is still established a difference of as high as 60% so that the region 111 can be sufficiently judged as a defective one.

In order to realize this method, the arithmetic circuit of FIG. 6 can be used as it is. The data 21B and 21F indicating the numbers of the divided regions are fed to the dictionary memory 11 and the address generating circuit 13, and the contents corresponding to the divided regions are read out of the dictionary memory 11 and the image memory 12 so that the patterns are subjected to the comparison processing. At this time, the content of the same divided region is generated from the dictionary memory 11, and the pattern comparison is made by slightly shifting horizontally and vertically only for the image memory 12 so that the minimum disagreed area at that time is used as the difference area at that divided region.

The reason why the allowed values 11B are changed for each region is that the more precise judgements are to be accomplished by changing the allowed values in accordance with the areas of the boundaries of the pattern contained in the regions. It is, however, sufficient that the allowed values are set at such a constant value irrespective of the regions and the kinds of the patterns, for simplicity only, as not stored even in the dictionary memory 11.

In the foregoing description, the trials regarding the position discrepancy are accomplished in a consecutive manner. It is, however, sufficient that the data corresponding to all position discrepancies are read in parallel out of the image memory 12 and that the arithmetic circuit is also arranged in parallel to effect the calculations so that the minimum values of the parameters calculated may be determined all at once. As an intermediate method, the several discrepancies are processed in parallel, and these processing operations are accomplished consecutively so that all of them may be processed.

According to a second method suitable for the comparison between the pattern to be inspected and the dictionary pattern, a dictionary pattern which has been subjected to conversion into at least three-value levels is prepared for the standard letter or picture which is intrinsically composed of two-value level of black and white, and the pattern to be inspected is converted into the shade levels of multiple stages. As is sufficient, the two patterns are converted into the two-value levels and compared, and the comparison results are used so that the dictionary pattern level is integrated, in case there is a difference inbetween, while adding the level of the pattern to be inspected, whereby the letter or picture may be evaluated by the resultant integrated value. According to this method, a higher level is imparted to the portion where a problem for the pattern recognition in the dictionary pattern is raised, and the application of the levels can be made such that the portion where no problem arises in the pattern recognition so that evaluation can be made as to the recognizability or readability of the pattern. If, moreover, the level of the pattern to be inspected is taken into consideration, the contrast of the pattern, which can be one of the factors concerning the readability, can also be taken into evaluation.

Figure 7:
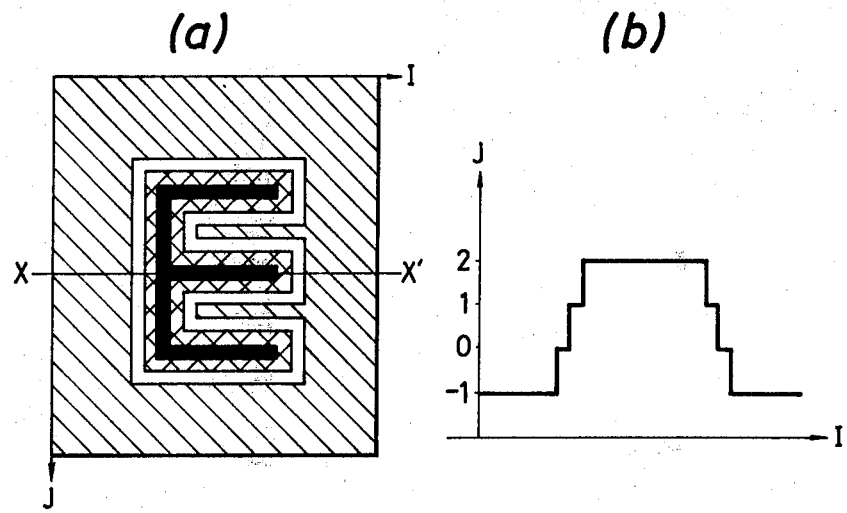
FIGS. 7a, b and 8 are diagrammatical views illustrating the dictionary pattern and the pattern to be inspected, both belonging to the second embodiment of the arithmetic circuit.

FIG. 7(a) shows one example of the dictionary pattern based on the above concept. For the letter "E", the boundary between the black and white is weighted at "0", and this weighting is increased from "1" to "2" as the center of the letter is approached. On the other hand, the remaining circumferential portions are all weighted at "−1". FIG. 7(b) is a graphical presentation showing the weighting behaviors of the center portion of the aforementioned letter "E" along line X—X'. The weighting from "−1" to "2" has the following meaning.

Figure 8:
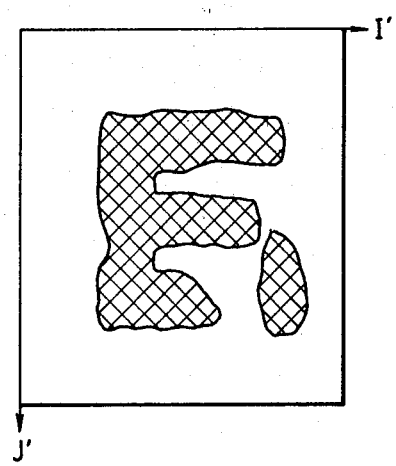

First of all, discrimination is made such that the letter portion is made to have a positive value whereas the other portions are made to have a negative value, and the center portion is the most weighted in the letter portion. Next, the value "0" at the boundary portion between the black and white is instable because of the boundary condition and is not important from the standpoint of the letter construction so that it is out of evaluation. On the contrary, FIG. 8 shows one example of the letter to be evaluated. In this figure, for simplicity of illustration, the portion with the letter or the like is weighted at "1" whereas the remaining portion is weighted at "0", thus effecting the conversion into the two-value levels.

One example of the arithmetic circuit 20 for realizing the second method thus far described is shown in FIG. 9. In this circuit, the dictionary pattern and the pattern to be inspected are consecutively extracted, and the deficient and excess regions are detected from the pattern to be inspected so that the weighting level of the corresponding dictionary pattern is added for evaluation.

First of all, the coordinate signals (I, J) 30B and 30C from a timing control circuit 30 are fed to the dictionary memory 11 and the address generating circuit 13. The dictionary pattern signals 11S read out in a manner to correspond to the coordinate signals are converted into bi-value signals 31S of "1", in case they are equal to or higher than zero, and of "0", in case they are at a level of −1, by the action of a thresholding circuit 31. Likewise, the inspected pattern signal 12S read out of the image memory 12 and the aforementioned bi-value signal 31S are fed to a disagreement detecting circuit 32 to take their exclusive OR so that a disagreement signal 32S assumes an OR "1" when they disagree. On the other hand, the dictionary pattern signal 11S is converted into an absolute value signal 33S by the action of an absolute value generating circuit 33 so that it is fed through a gate 34 to an adder 35 in case the disagreement signal 32S has the value "1". In fact, incidentally, such a number of gates 34 as corresponds to the bit number of the output of the absolute value generating circuit 33 are provided, although only one of them is shown in FIG. 9. The evaluation value 36S, which is stored in a evaluation value memory 36, and the output value 34S of the aforementioned gate 34 are added by the adder 35 and are stored again in the evaluation value memory 36. A signal 30D is a timing signal at that time. Moreover, a resetting signal 30A is used for clearing the memory at first.

If such comparison is made all over the pattern to be inspected and the dictionary pattern, the defective portion and the excess portion of the former pattern can be extracted to determine the values which are evaluated by the weights of the respective dictionary patterns so that they can be extracted as the parameter 20S in response to the completion timing signal 30E of the comparing cycle. This parameter 20S is a value for indicating the evaluation value of the substantial quality such as the readability of the pattern irrespective of the boundary portion of the letter.

Figure 10:
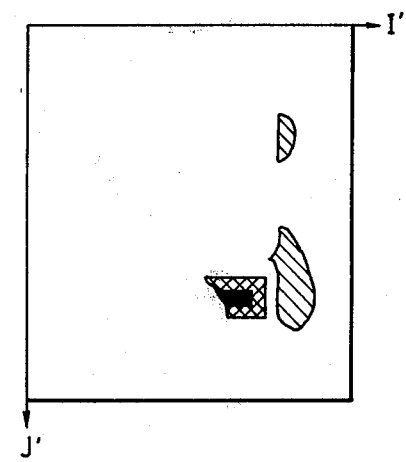
FIG. 10 is a diagrammatical view illustrating the inspection results of the second embodiment of the arithmetic circuit.

FIG. 10 shows the pattern which has its defective and excess portions evaluated at that time by the dictionary pattern.

In case the second method thus far described is to be accomplished, the pattern to be inspected at each position discrepancy may be extracted in parallel to be processed or may be made to have a multiple steps of levels and evaluated including the contrast condition in order to shorten the time period for the processing.

There is also disclosed a third method, in which the quantity of information concerning the standard pattern and the pattern to be inspected is reduced without deteriorating the evaluating performance so that the quality of the letter and picture can be evaluated at a high speed with the use of the small-sized construction of the device. According to this third method, a suitable number of fixed points, which are extracted from the portions having the letter or picture and other portions with respect to the standard letter and picture, are stored as the dictionary data. From the letter and picture to be evaluated, on the other hand, there are extracted such a pattern to be evaluated as has at least two shade levels. The grouped fixed points fed from the aforementioned dictionary data are aligned with the pattern to be inspected so that the shade level of the local pattern cut in a suitable size out of the vicinity of the fixed position is compared with the shade level of the fixed point portion of the dictionary data. The shade levels of the local patterns are integrated in accordance with the compared results so that the qualities of the letter and the picture are evaluated in accordance with the integrated value. For instance, the local pattern having the picture elements of 3×3 to be inspected is cut out of the center portion of the picture element (xi, yi) which is located at a preset position in the pattern to be inspected, as shown in FIG. 11, and the shade level of each picture element of the local pattern is compared with that of the picture element of the fixed point portion corresponding to the dictionary data. Thus, the number of the picture elements of the local pattern, which have the agreed or disagreed shade level with or from that of the fixed point portion of the dictionary data, is determined as the integrated value. The quality of the pattern to be inspected is evaluated by the value thus determined. In this instance, the aforementioned integrated values in the local patterns corresponding to all the fixed points are determined and summed so that the qualities of the letter and picture are evaluated in accordance with the summed value.

Moreover, whether or not the shade levels of the local patterns agree with those of the corresponding fixed points is judged in accordance with whether or not the integrated values in those local patterns are higher than a preset value. From the independent judgement results of the respective local patterns, the quality of the letter and picture as a whole may be evaluated.

If, for example, the number of the picture elements, in which the shade level of a certain local pattern agrees with that of a corresponding fixed point, is at most two, the level of the fixed point in that local pattern disagrees from that of the fixed point in the dictionary data thereby to judge that there exists a defective portion. In case several defective portions are found, the letter or picture is evaluated to be defective as a whole.

According to these procedures, the information to be handled is represented by the information of a limited number of the fixed points and of the local patterns so that the inspection processing operations can be accomplished at a higher speed and that the size of the device can be reduced.

Since, moreover, the information of the local pattern including the periphery of a fixed point is employed, the evaluation of the pattern can be precisely accomplished even if there are more or less noises in the pattern and even in case the line width of the letter or the like constituting the pattern becomes smaller than the normal one.

By providing the fixed point at a constructionally important portion such as the line or peripheral portions of the letter and picture, moreover, the substantial quality evaluation such as the readability can be performed irrespective of the unstable portion such as the pattern boundary of the letter and picture.

The third method will now be described in connection with a concrete example thereof with reference to the drawings.

FIG. 12 illustrates a group of the fixed points which are formed for the standard letter "E". Among them, the solidly black rectangular fixed points indicate the group of the core lines of the letter or picture whereas the hollow rectangular fixed points indicate the group of the peripheral portions. These respective fixed points are tabulated in the following:

| Fixed Point No. | Flag | Coordinates | |
|---|---|---|---|
| 1 | $F_1$ | $I_1$ | $J_1$ |
| 2 | $F_2$ | $I_2$ | $J_2$ |
| — | — | — | — |
| — | — | — | — |
| N | $F_N$ | $I_N$ | $J_N$ |

Figure 13:
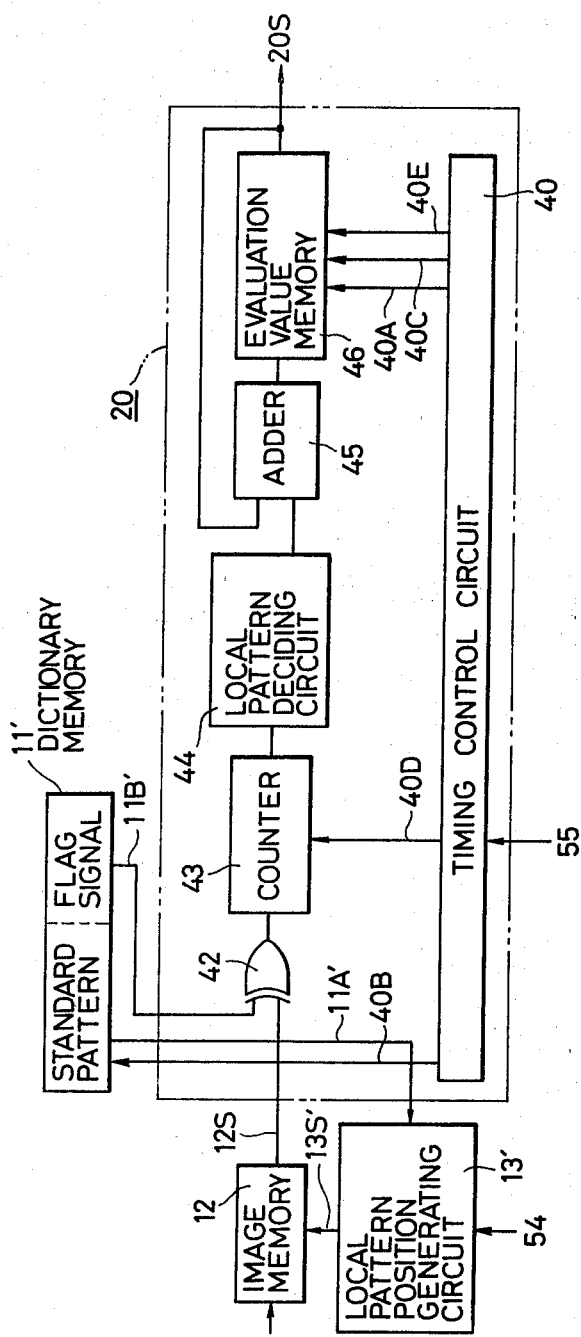
FIG. 13 is a block diagram showing the third embodiment of the arithmetic circuit.

In the above Table, "Flag" divides the letter portions and the peripheral portions such that the fixed points extracted from the letter portions are set at "1" whereas the fixed points extracted from the peripheral portions are set at "0". On the other hand, the coordinates (I, J) indicate the coordinate values of the fixed points extracted and are stored as a dictionary in the memory. An example of the construction of the arithmetic circuit 20 for evaluating the pattern, which has been shown hereinbefore in FIG. 8, in accordance with the dictionary data of this type is shown in FIG. 13.

In this circuit, a timing control circuit 40 first generates an initial resetting signal 40A, by which a evaluation value memory 46 is cleared, and then a reading-out signal 40B is fed to a memory 11' which stores the aforementioned dictionary data. Among the signals extracted as the dictionary data, a fixed point position signal 11A' is fed to a local pattern position generating circuit 13', where a local pattern position signal 13S' about the fixed point position is fed to the image memory 12 which stores the pattern to be inspected. If, at this time, a preset value ($\Delta I$, $\Delta J$) 54 is added to the local pattern position signal by the local pattern position generating circuit 13', the dictionary data and the pattern to be inspected can be compared with the position being shifted. Then, the exclusive OR is taken between the local pattern data thus obtained and the flag signal 11B' consecutively read out of the dictionary memory by the action of a comparing circuit 42 so that the resultant output is counted by a counter 43 in case it has a different shade level from that stored in the dictionary memory. The value of the counter 43 indicates the number of the picture elements of such a local pattern corresponding to one fixed point as has a different shade level from that of the fixed point, i.e., the area of the defective portion of the local pattern so that an output "1" is generated, judging that the local pattern corresponding to the fixed point of the dictionary is defective, by the action of a local pattern deciding circuit 44, e.g., when the area exceeds a preset threshold value. The output times of the signal "1" are added by an adder 45 to the content of the evaluation value memory, and the summed value is stored again in the evaluation value memory 46. A signal 40D is a resetting signal of the counter 43, in response to which the content of the defective local pattern area counter 43 is cleared each time the one fixed point is shifted.

If the foregoing operations are repeated for all the fixed points, the defective condition of the constructionally important portion of the pattern to be inspected can be grasped through the fixed points, and the quality level, i.e., the evaluation can be performed in accordance with the number of the fixed points which are found defective. Moreover, all the information to be processed is only the information of the fixed points and the information of the corresponding local pattern so that it can be processed at a high speed with the use of the simple construction of the device. FIG. 14 illustrates the defective portion of the local pattern when the pattern of FIG. 8 is evaluated.

In the arithmetic circuit 20 for practising the third method thus far described, the local pattern deciding circuit 44 can be dispensed with. In this instance, the evaluation value memory 46 stores the total value of the defective areas of the local pattern so that the whole letter can be evaluated irrespective of the respective fixed points. In order to further shorten the processing time, moreover, it is sufficient that the local patterns can be extracted in parallel and processed. In order to further reduce the storage capacity of the dictionary, still moreover, the coordinates of the fixed point may be expressed by the relative coordinates to those of the former fixed point, and the pattern to be inspected may take multiple levels.

Incidentally, the control circuits shown in FIGS. 3, 6, 9 and 13 can be easily realized by the use of a microcomputer or the like.

Figure 15:
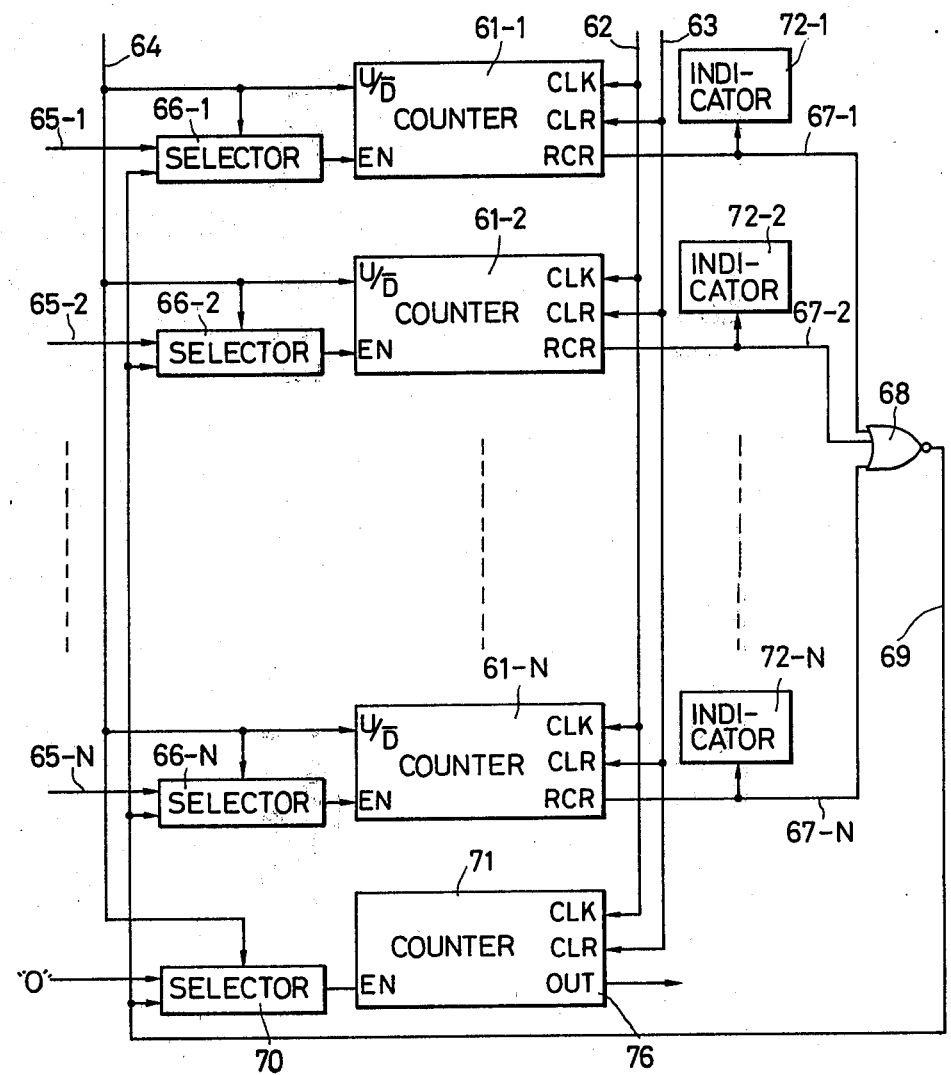
FIG. 15 is a connection diagram showing one embodiment of a counter circuit to be used with the pattern defect inspecting device according to the present invention.

FIG. 15 shows the construction of one embodiment of the counter circuit, in which the disagreement in the picture elements between the standard pattern and the respective local patterns is detected so that the number of the disagreements is counted to generate the minimum the count value.

Characters 61-1 to 61-N indicate an N number of synchronous type reversible counters; 62 indicates the signal line of the clock signal; 62 indicates the signal line of the clear signal; 64 indicates the signal line of a polarity designating signal; 65-1 to 65-N indicate the signal lines of input signals corresponding to the counters 61-1 to 61-N, respectively; 66-1 to 66-N indicate selectors provided to correspond to the counters 61-1 to 61-N; 67-1 to 67-N indicate the signal lines of digit carrying signals of the counters 61-1 to 61-N, respectively; 68 indicates an NOR gate; 69 indicates the output signal line of the NOR gate 68; 70 indicates a selector; 71 indicates a main counter; and 72-1 to 72-N indicate indicators indicating the signals of the signal lines 67-1 to 67-N. Moreover, numeral 76 indicates the signal line of an output signal.

FIG. 16 shows examples of the input and count values at the respective timings of the counters 61-1 to 61-N and 71 of FIG. 15 for N=3.

Figure 17:
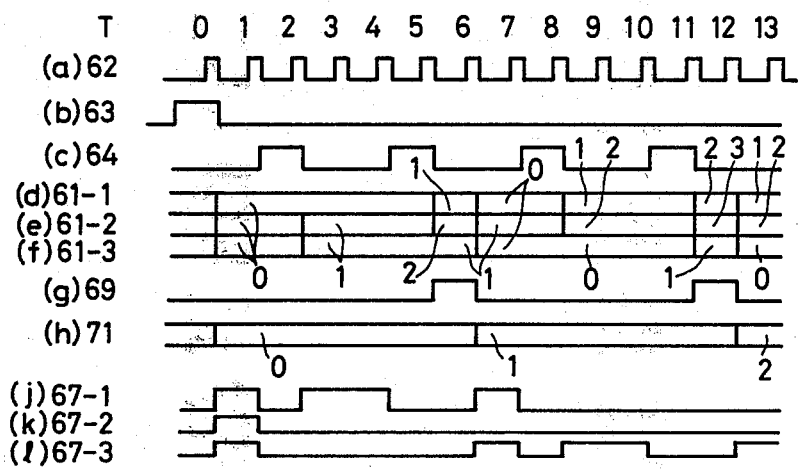
FIG. 17 is a timing chart explaining the operations of the circuit of FIG. 15.

FIG. 17 shows the timing charts of the respective signals of the circuit of FIG. 15 in case the counting operations shown in FIG. 16 are accomplished. In FIG. 17: letter (a) indicates the clock signal of the signal line 62; (b) indicates the clear signal of the signal line 63; (c) indicates the polarity designating signal of the signal line 67; (d), (e) and (f) indicate the counted contents of the counters 61-1, 61-2 and 61-3; (g) indicates the minimum renewal detecting signal of the signal line 69; (h) indicates the counted content of the main counter 71; and (j), (k) and (l) indicate the digit carrying signals of the signal lines 67-1, 67-2 and 67-3, respectively.

As the synchronous type reversible counter, incidentally, there can be used a series connection of plural circuits which are disclosed in the upper column of page 227 of "The TTL Data Book for Design Engineers (Second Edition)" Section 7, wherein: letters U/D indicate the terminal of the polarity designaging signal; EN indicate the terminal of an enable signal; CLK indicate the terminal of the clock signal; CLR indicate the terminal of the clear signal; RCR indicate the terminal of the digit carrying signal; and OUT indicate the terminal of the output signal.

The operations of the circuit of FIG. 15 will now be described in detail with reference to FIGS. 16 and 17. Here, it is assumed that the circuit is composed of counters 61-1, 61-2, 61-3 and 71.

First of all, at a timing T1, all the counters 61-1, 61-2, 61-3 and 71 are supplied at their terminals CLRs with the clear signals through the signal line 63 so that all of them are initialized, i.e., set at 0. Subsequently, the counting operations are accomplished by using the three timings T2 to T4, T5 to T7, and T8 to T10 as a single operating unit. In this case, at the timings for the counting operations, e.g., T2, T5 and T8, the polarity designating signal of the line 64 is set at "1" so that the counters 61-1, 61-2 and 61-3 are set in positive count modes, and the selectors 66-1, 66-2 and 66-3 are switched to the input signal lines 65-1, 65-2 and 65-3 so that the counters corresponding to the signal line having its input signal at "1" are advanced stepwise. When the generation of the input signal takes place only at a preset timing, the polarity designating signal is set at "1" only at that timing and at "0" at other timings. On the other hand, when the generation of the input signal takes place in a random manner, the OR among the signals of the lines 65-1, 65-2 and 65-3 is used as the polarity designating signal. For example, when the reversible counters 61-2 and 61-3 are supplied at the timing T2 with their respective input signals, the contents of the reversible counters 61-2 and 61-3 take the value "1" at the timing T3. When the reversible counters 61-1 and 61-2 are supplied at the timing T5 with their respective input signals, the count values of the reversible counters 61-1 and 61-2 take the values "1" and "2" at the timing T6. As a result, all the contents of the reversible counters 61-1, 61-2 and 61-3 at that time all take a value equal to or higher than "1". The digit carrying signals at the terminals RCRs of the reversible counters 61-1, 61-2 and 61-3 generate the value "1", when their respective contents are at "0", i.e., the initial value, and the value "0" when the contents are not at "0". As has been described in the above, when all the contents of the reversible counters 61-1, 61-2 and 61-3 is at a value other than "0", the minimum renewal signal of the signal line 69 from the NOR gate 68 takes a value "1". At that timing, since the digit carrying signal of the signal line 64 takes the value "0", the respective selectors 66-1, 66-2 and 66-3 select the signal line 69, and since the signal of the line 69 takes the value "1", as has been described in the above, the respective reversible counters 61-1, 61-2 and 61-3 altogether effect the return counts of one. At this time, since the selector 70 selects the signal line 69, the main counter 71 effects the counting operation for increasing only one. As a result, at the timing T7, the contents of the counters 61-1, 61-2, 61-3 and 71 take the values "0", "1", "0" and "1", respectively, so that the signal of the line 69 take the value "0" thereby to stop the counting operations of the counters. At the timing T8, then, the reversible counters 61-1 and 61-2 are supplied with the input "1", and, at the timing T11, the reversible counters 61-1, 61-2 and 61-3 are supplied with the input "1". Then, all the contents of the counters 61-1, 61-2 and 61-3 become other than "0" so that the contents are subjected to the return counting operation by "1" and so that the content of the main counter 71 is counted up by "1".

By repeating those operations, the reversible counters 61-1, 61-2 or 61-3, in which the digit carrying signal of the signal line 67-1, 67-2 or 67-3 has the value "1", has the minimum count value, and the count value at that time is indicated in the main counter 71. The content of this main counter 71 is fed out of the terminal OUT.

By feeding the corresponding indicators 72-1, 72-2 and 72-3 with the digit carrying signals, therefore, the item having the minimum count value can be directly indicated. In the aforegoing example, incidentally, although there is described the case in which the number of the items, i.e., the number of the reversible counters is three, that number can generally be set at any desired number N. Moreover, the indicators 72-1 to 72-N can be dispensed with.

Figure 18:
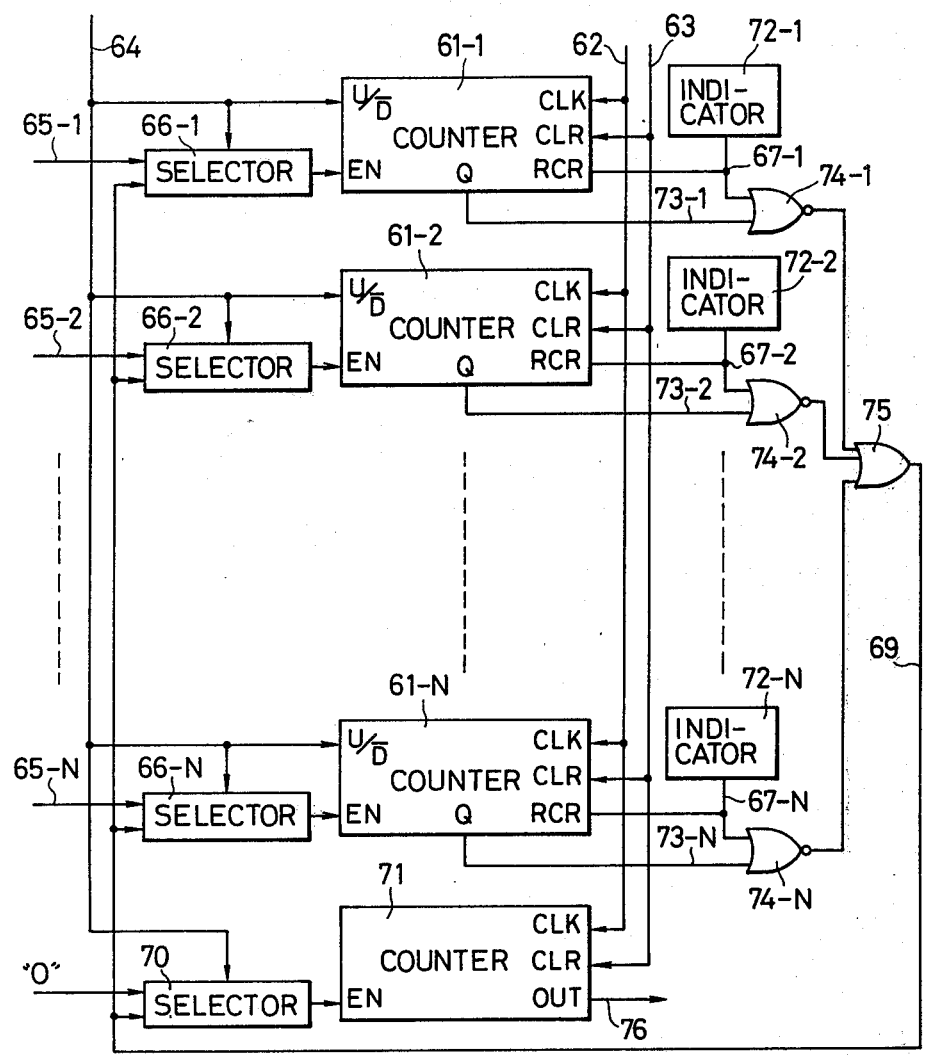
FIG. 18 is a connection diagram showing another embodiment of a counter circuit to be used with the pattern defect inspecting device according to the present invention.

FIG. 18 shows the construction of another embodiment of the counter circuit of FIG. 4. According to this embodiment of FIG. 18, the agreement in the picture elements between the standard pattern and the respective local patterns is detected, and the number of the agreements is counted to generate the maximum of the count values. In this embodiment, the initial value is also set at "0".

In FIG. 18: characters 73-1 to 73-N indicate the signal lines of the highest bits of the reversible counters 61-1 to 61-N, respectively; 74-1 to 74-N indicate NOR gates; and 75 indicates an OR gate. Other characters indicate those having the same characters of FIG. 15.

FIG. 19 illustrates the relationships between the input and count values at the respective timings of the respective counters of FIG. 18 for the case of N=3.

The embodiment shown in FIG. 18 is different from that of FIG. 15 in that, if the reversible counter having the count value of a positive number (excepting "0") is provided one, the contents of all the reversible counters 61-1 to 61-N are returned one at the subsequent timing whereas the content of the main counter 71 is increased only one. For this purpose, the highest bit signal of the count values, which is generated at the terminals Q of the reversible counters 61-1 to 61-N, is extracted from the signal lines 73-1 to 73-N so that its NOR with the digit carrying signals corresponding to those signals is taken at the NOR gates 74-1 to 74-N, and the OR is taken among the outputs of those NOR gates by the OR gate 75 so that the resultant output is used as the maximum renewal detecting signal of the signal line 69. At the NOR gates 74-1 to 74-N, therefore, the condition, under which the corresponding reversible counters 61-1 to 61-N have neither a negative value nor the value "0", i.e., the condition, under which the contents of the corresponding reversible counters are positive, is judged to detect that any of the contents of the reversible counters is positive from the OR gate 75.

In the example of FIG. 19, if any of the contents of the counters 61-1, 61-2 and 61-3 take the value "1" at the timings T3, T6 and T12, the signal of the line 69 takes the value "1" so that the contents of the reversible counters 61-1, 61-2 and 61-3 is reduced by one and so that the content of the main counter 71 is increased by one.

Other construction and operations are similar to those of the case of FIG. 15, and as such being the case their explanations are omitted here.

Incidentally, the counters similar to those of the case of FIG. 15 can be used as the aforementioned reversible counters 61-1 to 61-N.

Next, still another embodiment of the counter circuit for extracting the item having the maximum count value will be described with reference to FIGS. 20 and 21. In this embodiment, the digit carrying signal accompanying the change of the reversible counters between "0" and "−1" is employed.

Figure 20:
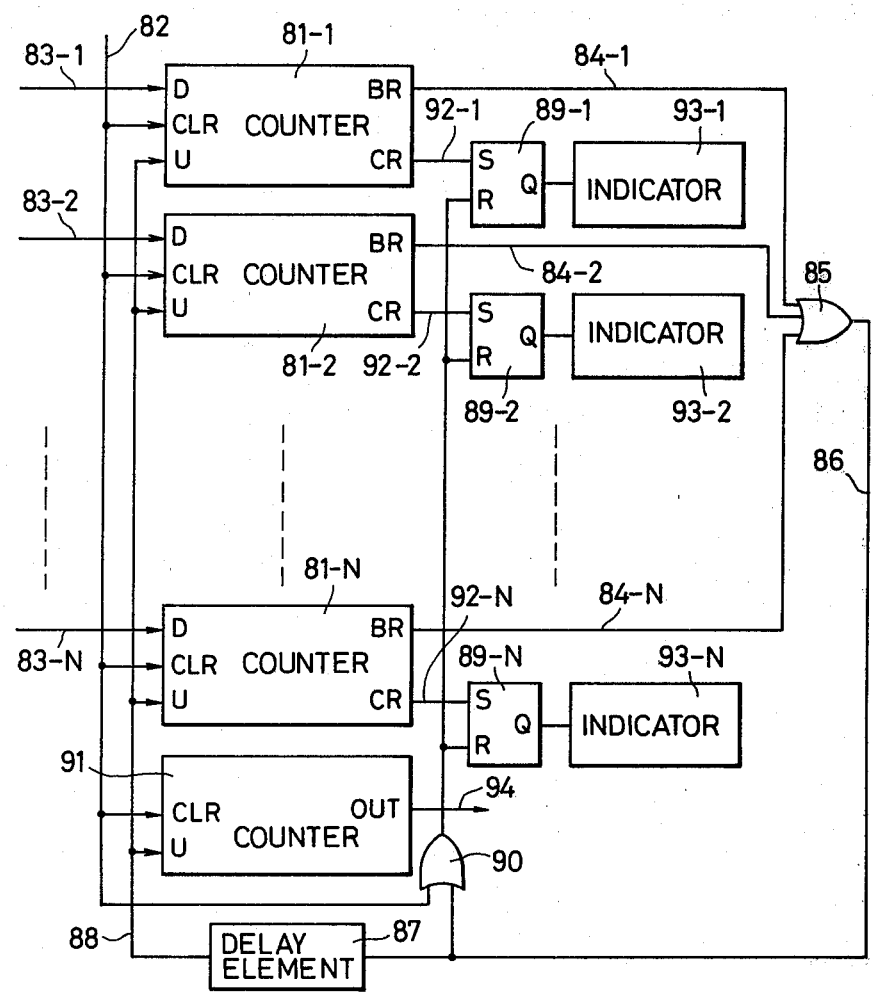
FIG. 20 is a connection diagram showing still another embodiment of a counter circuit to be used with the pattern defect inspecting device according to the present invention.
Figure 21:
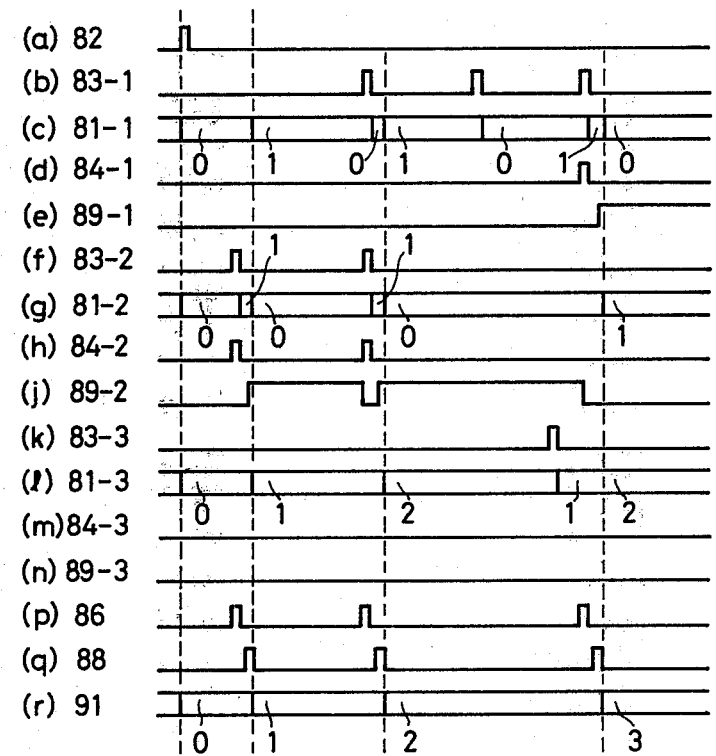
FIG. 21 is a timing chart explaining the operations of the circuit FIG. 20.

FIG. 20 shows the construction of the counter circuit, whereas FIG. 21 shows the timing charts of the signals of that circuit.

In FIG. 20: characters 81-1 to 81-N indicate asynchronous type reversible counters; 82 indicates the signal line of the clear pulses; 83-1 to 83-N indicate the input signal lines corresponding to the reversible counters 81-1 to 81-N, respectively; 84-1 to 84-N indicate the signal lines of the inverse digit carrying borrow signals fo the counters 81-1 to 81-N, respectively; 85 indicates an OR gate; 86 indicates the signal line of a maximum renewal detecting signal; 87 indicates a delay element; 88 indicates the signal line of the output signal of the delay element 87; 89-1 to 89-N indicate flip-flops; 90 indicates an OR gate; 91 indicates a main counter; 92-1 to 92-N indicate the signal lines of the positive digit carrying signals of the reversible counters 81-1 to 81-N; 93-1 to 93-N indicate indicators; and 94 indicates the signal line of an output signal.

FIG. 21 shows the timing charts of the signals of FIG. 20 for the case of N=3. In FIG. 21: letter (a) indicates the clear pulses of the signal line 82; (b), (f) and (k) indicate the input signals of the signal lines 83-1, 83-2 and 83-3, respectively; (c), (g) and (l) indicate the count contents of the reversible counters 81-1, 81-2 and 83-3, respectively; (d), (h) and (m) indicate the inverse digit carrying borrow signals fed out of the reversible counters 81-1, 81-2 and 81-3, respectively; (e), (j) and (n) indicate the outputs of the flip-flops 89-1, 89-2 and 89-3, respectively; (p) indicates the maximum renewal detecting signal of the signal line 86; (q) indicates the output signal of the delay element 87; and (r) indicates the count content of the main counter 91.

The operations of the circuit of FIG. 20 will now be described with reference to FIG. 21.

As the asynchronous reversible counters 81-1 to 81-N, incidentally, there can be used the counters, in which the inputs of the forward and backward count pulses are independent (at terminals D and U) and in which there are forward and backward digit carrying pulse outputs (at terminals BR and CR) for the series connection to the higher digit. For instance, there can be used a series connection of required plural circuits, which are disclosed in the upper column of page 307 of "The TTL Data Book for Design Engineers (Second Edition)", section 7.

First of all, all the counters 81-1 to 81-N and 91 are set at "0" in response to the clear pulses of the signal line 82. The input signal lines 83-1 to 83-N of the respective reversible counters are connected with the terminal D for the backward count input so that the contents of the reversible counters 81-1 to 81-N are reduced by one in response to the pulses to the input signal lines 83-1 to 83-N. As shown in FIG. 21, for example, when the input signal line 83-2 is supplied with the input pulses, the content of the corresponding reversible counter 81-2 is changed from "0" to "−1" so that the backward digit carrying borrow signals are generated at the signal line 84-2. As a result, there can be fed out of the signal line 86 the maximum renewal detecting signal, which is delayed by the delay element 87 and which is fed to the terminal U for receiving the positive count inputs of all the counters including the main counter 91 while being prevented from being superposed upon the input pulses. As a result, the content of the counter 81-2, which has taken the value "−1" restores the value "0", whereupon the forward digit carrying signals are generated at the signal line 92-2 to set the corresponding flip-flop 89-2. This flip-flop continues its set condition until the subsequent maximum renewing signal is generated and reset through the OR gate 90. Incidentally, the flip-flops 89-1 to 89-N are reset through the OR gate 90 by the clear pulses even when the value "0" is first set in the reversible counters. Therefore, the reversible counter corresponding to the flip-flop under its set condition corresponds to the counter having the maximum count value. By feeding the outputs of those flip-flops 89-1 to 89-N to the corresponding indicators 93-1 to 93-N, the item having the maximum count value can be indicated. On the other hand, the main counter 91 holds the maximum count value at that time. The content of this main counter 91 is fed out of the signal line 94.

Still another embodiment of the counter circuit for extracting the minimum count value will be described with reference to FIG. 22.

Figure 22:
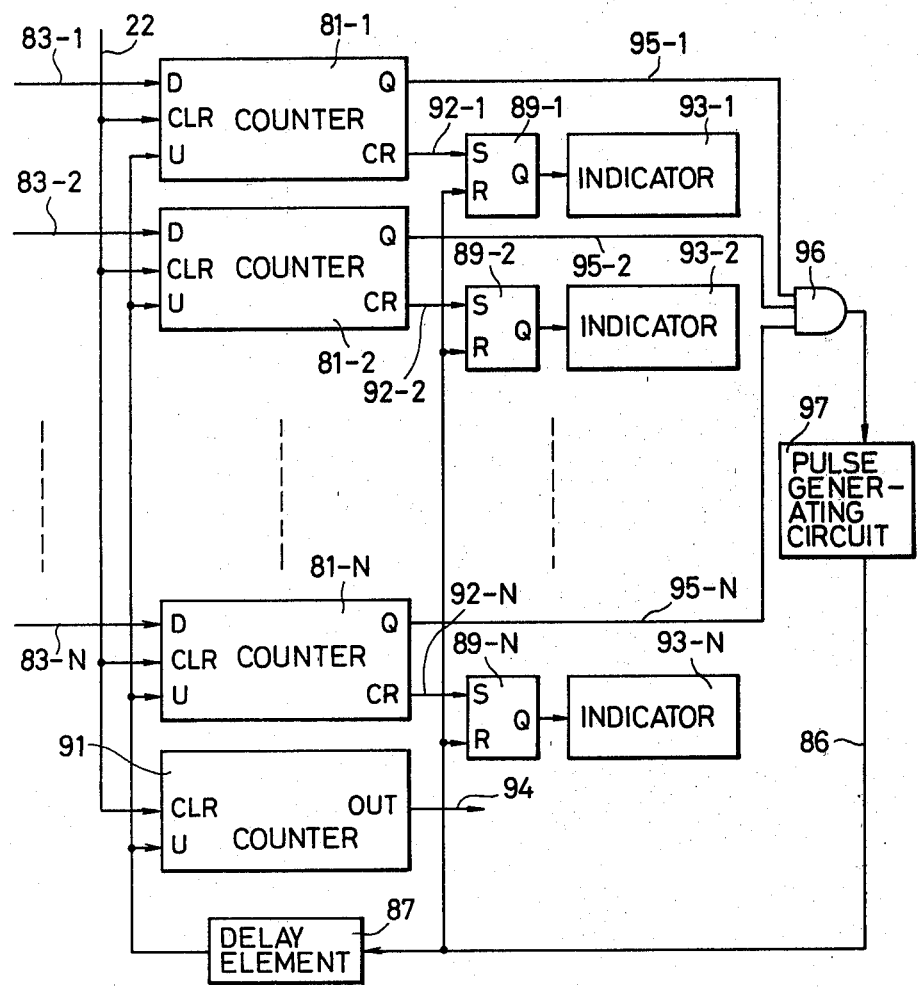
FIG. 22 is a connection diagram showing a further embodiment of a counter circuit to be used with the pattern defect inspecting device according to the present invention.

FIG. 22 shows the construction of the counter circuit, which is different from the embodiment of FIG. 20 in the fact that all the highest bits (or character bits) of the respective reversible counters 81-1 to 81-N take the value "1", i.e., that the contents of the reversible counters take all but the value "0" and it is detected when all turn negative so that they are counted up by one.

By using as the input of the AND gate 96 the signal lines 95-1 to 95-N which are connected with the terminals of the highest bits (or character bits) of the reversible counters 81-1 to 81-N, more specifically, the fact that all the highest bits (or character bits) of the counters 81-1 to 81-N take the value "1" is detected from the AND gate 96 so that pulses are generated from the pulse generating circuit 97 and fed as the minimum renewal detecting signals to the signal line 86. The other operations are similar to those of the case of FIG. 20, and their explanations are omitted here. Therefore, the main counter 91 holds the minimum count value whereas the reversible counters 81-1 to 81-N hold the differences from the minimum count value as negative values.

In the foregoing embodiment, there is described an example, in which both the items having the minimum count value and the items having the maximum count value are realized by means of the different circuits. Since, however, the two items have many common portions, they can be realized by the common circuit such that they are only partially switched. For example, in the circuits of FIGS. 15 and 18, there is provided a circuit for switching the output of the NOR gate 68 of FIG. 15 and the output of the OR gate 75 of FIG. 18 so that the counters 61-1 to 61-N and 71, the selectors 66-1 to 66-N and 70 and the indicators 72-1 to 72-N can be made common. In the circuits of FIGS. 20 and 22, moreover, there is also provided a circuit for switching the output of the OR gate 85 of FIG. 20 and the output of the pulse generating circuit 97 of FIG. 22 so that the counters 81-1 to 81-N and 91, the delay element 87, the flip-flops 89-1 to 89-N and the indicators 93-1 to 93-N can be made common.

Incidentally, although the aforementioned embodiment is directed to the case in which the initial value is "0", it should not be limited thereto but can take any desired value.

Moreover, although the foregoing description is made for the case, in which the counter circuits shown in FIGS. 15 to 22 are used as the counter circuit of FIG. 4, it is needless to mention that such counter circuit can also be applied to the case in which the local patterns in the respective position discrepancies are extracted from the image memory of the circuits shown in FIGS. 6, 9 and 13 so that they may be processed.

We claim:

1. A pattern defect inspecting method for inspecting for defects in a pattern represented on an article comprising: a first step of picking up and storing an image from an article having a pattern to be inspected; a second step of extracting from said image a plurality of partial patterns at respective positions on the image which are offset by successively-increasing amounts from a reference position thereon; a third step of comparing each of said partial patterns extracted in said second step with a standard pattern corresponding to the pattern to be inspected to determine a parameter indicating the extent of lack of correspondence between the standard pattern and each of the respective partial patterns; a fourth step of selecting the parameter indicating the minimum extent of lack of correspondence from among the parameters determined in said third step; and a fifth step of comparing the parameter selected by said fourth step with a preset threshold value to determine the quality of said pattern to be inspected.

2. A pattern defect inspecting method as set forth in claim 1, further comprising a sixth step of determining the acceptability of the article having said pattern to be inspected on the basis of the comparing results of the fifth step.

3. A pattern defect inspecting method as set forth in claim 1 or 2, wherein said third step includes comparing each partial pattern and said standard pattern by comparing selected regions of said partial pattern to corresponding regions of said standard pattern thereby to determine the difference therebetween so that whether or not said areas exceed a preset threshold value is judged to determine the parameter indicating the degree of lack of correspondence of said partial pattern.

4. A pattern defect inspecting method as set forth in claim 1 or 2, wherein the third step includes a step of weighting said standard pattern at at least three levels in accordance with the position thereof to add said weighted levels at the difference portions between said partial pattern and said standard pattern thereby to determine the parameter indicating the defective degree of said partial pattern.

5. A pattern defect inspecting method as set forth in claim 1 or 2, wherein the third step includes a step of comparing a plurality of fixed points set on said standard pattern and the portions on said partial pattern, which correspond to said fixed points, to determine the parameter indicating the degree of disagreement between those two portions.

6. A pattern defect inspecting method as set forth in claim 1 or 2, wherein the third step includes a step of comparing the shade level of the fixed point set on said standard pattern and the shade level of the local pattern corresponding to said fixed point on said partial pattern to integrate the values according to the compared results thereby to determine the parameter indicating the defective degree of said partial pattern.

7. A pattern defect inspecting device for inspecting for defects in a pattern represented on an article comprising: first means for picking up and storing an image from an article having a pattern to be inspected; second means for extracting from said image a plurality of partial patterns at respective positions on the image which are offset by successively-increasing amounts from a reference position thereon; third means for comparing each of said partial patterns extracted by said second means with a standard pattern to determine a parameter indicating the the extent of lack of correspondence between the standard pattern and each of the respective partial patterns; fourth means for selecting the parameter indicating the minimum extent of lack of correspondence from among the parameters determined by said third means; and fifth means for comparing the parameter selected by said fourth means with a preset threshold value to determine the quality of said pattern to be inspected.

8. A pattern defect inspecting device as set forth in claim 7, further comprising sixth means for determining the acceptability of the article having said pattern to be inspected on the basis of the output of the fifth means.

9. A pattern defect inspecting device as set forth in claim 7 or 8, wherein first means includes image pick-up means for picking up an image from an article having the pattern to be inspected and an image memory for storing the image picked up by said image pick-up means, and wherein said second means includes address signal generation means for generating successive sets of address signals to read out of said image memory said partial patterns at the respective positions with respect to said reference position of the image stored in said image memory.

10. A pattern defect inspecting device as set forth in claim 7 or 8, wherein the third means includes a dictionary memory for storing data indicating said standard pattern, arithmetic means for comparing the respective partial patterns extracted by said second means with the data stored in said dictionary memory thereby to determine the parameter indicating the extent of lack of correspondence of each partial pattern with said standard pattern, and wherein said fourth means includes detecting means for selecting the parameter indicating the minimum degree of lack of correspondence from among the parameters determined by said arithmetic means.

11. A pattern defect inspecting device as set forth in claim 7 or 8, wherein said third means includes a dictionary memory for storing data indicating said standard pattern, comparing means for comparing the data read out of said dictionary memory and the data extracted by said second means at respective discrepancy positions thereby to generate signals indicating the degree of agreement between the two data at the respective discrepancy positions, and counter means for counting the signals which are generated by said comparing means, thereby to determine a minimum count value.

12. A pattern defect inspecting device as set forth in claim 10, wherein said arithmetic means includes means for comparing said partial patterns and said standard pattern on the basis of respectively-selected corresponding regions thereof to determine the different areas of the two patterns, means for juding that the corresponding region of a partial pattern is defective if the different areas determined by the comparing means of said arithmetic means are higher than a preset value, and means for counting the number of the areas which are judged defective by the judging means of said arithmetic means.

13. A pattern defect indicating device as set forth in claim 10, wherein said dictionary memory stores data which results from weighting said standard pattern at least at three levels in accordance with the position thereof; and wherein said arithmetic means includes comparing means for respectively comparing the partial pattern data and the standard pattern data thereby to generate a signal indicating lack of correspondence therebetween, and means for adding the corresponding weighted levels, which are stored in said dictionary memory, in response to the signal generated by said comparing means, thereby to generate the added result as the parameter indicating the extent of lack of correspondence of said partial pattern with said standard pattern.

14. A pattern defect inspecting device as set forth in claim 10, wherein said dictionary memory includes a memory for storing the level of a fixed point on said standard pattern; and wherein said arithmetic means includes means for comparing the level of said fixed point and the level of a point on the standard pattern corresponding to the fixed point on the partial pattern thereby to integrate the value according to the compared result, and means for judging whether the value integrated by the comparing means of said arithmetic means is higher than a preset value or not thereby to determine the parameter indicating the degree of lack of correspondence of said partial pattern to said standard pattern.

15. A pattern defect inspecting device as set forth in claim 11, wherein said counter means includes a plurality of reversible counters for counting the respective outputs from said comparing means, detecting means for detecting that the contents of a preset number of said reversible counters are shifted by one from an initial value, control means for changing all the contents of said reversible counters only by one in accordance with the detections of said detecting means in the opposite direction to the discrepancy direction from said initial value, and a main counter for counting one upon each detection of said detecting means thereby to generate the minimum count value of said counting means.

* * * * *